United States Patent
Anschutz et al.

(10) Patent No.: US 11,553,035 B2
(45) Date of Patent: *Jan. 10, 2023

(54) CROSS-PLATFORM MODULE FOR LOADING ACROSS A PLURALITY OF DEVICE TYPES

(71) Applicant: HYLAND SWITZERLAND SÀRL, Geneva (CH)

(72) Inventors: Cynthia Diane Anschutz, Overland Park, KS (US); Shane Evan Blazek, Shawnee, KS (US); David Mark Elton, Kansas City, KS (US); Kristopher John Andrew Haney, Olathe, KS (US)

(73) Assignee: HYLAND SWITZERLAND SÀRL, Corcelles (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/496,899

(22) Filed: Oct. 8, 2021

(65) Prior Publication Data
US 2022/0030052 A1    Jan. 27, 2022

Related U.S. Application Data

(63) Continuation of application No. 15/130,767, filed on Apr. 15, 2016, now Pat. No. 11,159,603.
(Continued)

(51) Int. Cl.
*H04L 67/10* (2022.01)
*H04L 67/00* (2022.01)
(Continued)

(52) U.S. Cl.
CPC .......... *H04L 67/10* (2013.01); *G06F 9/44521* (2013.01); *H04L 67/02* (2013.01);
(Continued)

(58) Field of Classification Search
CPC ......... H04L 67/10; H04L 67/02; H04L 67/34; G06F 9/44521; G06F 9/451; G06F 8/34; G06F 8/36
See application file for complete search history.

(56) References Cited

U.S. PATENT DOCUMENTS 7,111,243 B1    9/2006  Ballard et al.
7,752,242 B1    7/2010  Satish et al.
(Continued)

OTHER PUBLICATIONS

Rubin, Blake J., "Office Action for U.S. Appl. No. 15/130,767", dated Jun. 22, 2018, 10 pages.
(Continued)

*Primary Examiner* — Blake J Rubin
(74) *Attorney, Agent, or Firm* — Eschweiler & Potashnik, LLC

(57) ABSTRACT

Methods for loading a module on a plurality of device types without modification includes initializing an application native to the client device, the application including a web browser; determining a module to be loaded on the application, the module written in a web-based format and having a set of dependencies indicated within a code thereof; and loading the determined module on the web browser for recognition by the application native to the client device. The loading the determined module on the web browser includes loading the set of dependencies of the module.

20 Claims, 4 Drawing Sheets

Related U.S. Application Data

(60) Provisional application No. 62/148,092, filed on Apr. 15, 2015.

(51) Int. Cl.
  *H04L 67/02* (2022.01)
  *G06F 9/445* (2018.01)
  *G06F 8/34* (2018.01)
  *G06F 8/36* (2018.01)
  *G06F 9/451* (2018.01)

(52) U.S. Cl.
  CPC ............... *H04L 67/34* (2013.01); *G06F 8/34* (2013.01); *G06F 8/36* (2013.01); *G06F 9/451* (2018.02)

(56) References Cited

U.S. PATENT DOCUMENTS

| | | | |
|---|---|---|---|
| 8,347,263 | B1 | 1/2013 | Offer |
| 8,631,065 | B2* | 1/2014 | Dargahi ............... H04L 51/42 715/714 |
| 8,732,607 | B1 | 5/2014 | Grechishkin et al. |
| 9,002,864 | B1 | 4/2015 | Payne |
| 9,219,719 | B1 | 12/2015 | Jagpal et al. |
| 9,448,776 | B1* | 9/2016 | Sankaran ............... G06F 16/972 |
| 9,992,268 | B2* | 6/2018 | Atsatt ............... G06F 8/36 |
| 11,159,603 | B2 | 10/2021 | Anschutz et al. |
| 2004/0034654 | A1 | 2/2004 | Simpson et al. |
| 2005/0120120 | A1 | 6/2005 | Suzuki |
| 2006/0041639 | A1* | 2/2006 | Lamkin ............... H04N 21/4325 348/E5.002 |
| 2006/0089147 | A1* | 4/2006 | Beaty ............... H04W 4/00 455/445 |
| 2009/0237728 | A1 | 9/2009 | Yamamoto |
| 2010/0251232 | A1 | 9/2010 | Shinomiya |
| 2010/0306696 | A1* | 12/2010 | Groth ............... G06F 3/0481 715/800 |
| 2011/0010642 | A1 | 1/2011 | Nagai |
| 2011/0185013 | A1* | 7/2011 | Obata ............... G06F 16/188 718/1 |
| 2011/0202905 | A1 | 8/2011 | Mahajan |
| 2011/0258631 | A1 | 10/2011 | Ohashi |
| 2012/0092691 | A1 | 4/2012 | Sasakuma |
| 2012/0174064 | A1 | 7/2012 | Polly et al. |
| 2012/0239598 | A1 | 9/2012 | Cascaval et al. |
| 2012/0314245 | A1 | 12/2012 | Nakashima |
| 2013/0036196 | A1 | 2/2013 | Chan et al. |
| 2013/0055070 | A1* | 2/2013 | Sacks ............... G06F 21/53 715/234 |
| 2013/0152047 | A1 | 6/2013 | Moorthi et al. |
| 2013/0219415 | A1 | 8/2013 | Jeon et al. |
| 2013/0262978 | A1 | 10/2013 | Reshadi et al. |
| 2014/0047324 | A1 | 2/2014 | Sasakuma |
| 2014/0109072 | A1 | 4/2014 | Lang et al. |
| 2014/0237133 | A1* | 8/2014 | Liu ............... H04L 69/24 709/230 |
| 2014/0368869 | A1 | 12/2014 | Park et al. |
| 2015/0094150 | A1* | 4/2015 | Gregory ............... A63F 13/30 463/42 |
| 2015/0193241 | A1* | 7/2015 | Hamzata ............... G06F 9/542 719/320 |
| 2015/0242163 | A1 | 8/2015 | Kogure |
| 2015/0242371 | A1 | 8/2015 | Yu et al. |
| 2015/0317171 | A1* | 11/2015 | Blazek ............... G06F 8/70 717/166 |
| 2015/0341518 | A1 | 11/2015 | Shimizu |
| 2015/0358761 | A1 | 12/2015 | Ito |
| 2016/0077901 | A1 | 3/2016 | Roth et al. |
| 2016/0099963 | A1 | 4/2016 | Mahaffey et al. |
| 2016/0182604 | A1 | 6/2016 | Ensign et al. |
| 2016/0182610 | A1 | 6/2016 | Satoh |
| 2016/0205185 | A1* | 7/2016 | Gampel ............... H04L 69/08 709/218 |
| 2016/0266889 | A1* | 9/2016 | Gross ............... H04L 67/34 |
| 2016/0283606 | A1* | 9/2016 | Xiong ............... G06F 16/9577 |
| 2019/0171527 | A1 | 6/2019 | Mutalik et al. |

OTHER PUBLICATIONS

Rubin, Blake J., "Final Office Action for U.S. Appl. No. 15/130,767", dated Jun. 18, 2019, 12 pages.
Rubin, Blake J., "Office Action for U.S. Appl. No. 15/130,767", dated Feb. 21, 2020, 14 pages.
Rubin, Blake J., "Final Office Action for U.S. Appl. No. 15/130,767", dated Oct. 9, 2020, 15 pages.
Rubin, Blake J., "Pre-Brief Appeal Conference Decision for U.S. Appl. No. 15/130,767", dated Mar. 10, 2021, 2 pages.
Rubin, Blake J., "Notice of Allowance and Fees Due for U.S. Appl. No. 15/130,767", dated Jun. 23, 2021, 8 pages.

* cited by examiner

CROSS-PLATFORM MODULE FOR LOADING ACROSS A PLURALITY OF DEVICE TYPES

CROSS REFERENCE TO RELATED APPLICATIONS

This application is a continuation of U.S. patent application Ser. No. 15/130,767 "the '767 application"), filed on Apr. 15, 2016 and entitled "CROSS-PLATFORM MODULE FOR LOADING ACROSS A PLURALITY OF DEVICE TYPES", the entirety of which is incorporated herein by reference. The '767 application claims priority to United States Provisional Patent Application No. 62/148,092, filed on Apr. 15, 2015 and entitled, "A Cross-Platform Module for Loading Across a Plurality of Device Types" the entirety of which is incorporated herein by reference.

STATEMENT REGARDING FEDERALLY SPONSORED RESEARCH OR DEVELOPMENT

None.

REFERENCE TO SEQUENTIAL LISTING, ETC

None.

BACKGROUND

1. Technical Field

The present disclosure relates generally to modular applications and more particularly to, a module for loading on a plurality of device types.

2. Description of the Related Art

In modular programming, a multi-functional application is divided into modules that are each assigned to a particular development group or developer in a company/organization. By delegating different functions of a multi-functional application into modules, the time for developing the application is reduced. Modules consist of a set of code written to perform a particular function in the application and conform to a format standardized by the company/organization, for example, throughout the modular application being developed. This way, once all the modules have been developed, these can be integrated easily and faster into the application. The application as well as its corresponding modules may then be packaged for deployment and usage in a device. In other examples, modules are delivered to a device for integration to an application.

Different device types operate in different platforms or programming environments, thus the type of device to which an application is targeted to be deployed in should be considered prior to proceeding with the development of the application. For instance, a gaming application developed for a smartphone may not execute on a desktop, unless the application is converted to a format or version recognizable by the desktop itself. In some scenarios, applications that are only functional in one device may be emulated on another device. Application emulators, however, require external support as opposed to applications that are native to a device type. As such, a module developed to perform a certain function of a multi-functional application on a first device type may not be integrated on another multi-functional application on a second device type.

Existing methods for running an application in various devices require developers to install a version of the application appropriate for each device type. While having different versions of an application compatible with each device type is sufficient in running the same application across different device platforms, time is wasted in developing versions of the application. Since different versions of the application are desired to be deployed, efforts put upon by current developers are doubled and/or more developers are needed for such deployment. The same problems are applicable with the modules associated with the application.

Accordingly, there exists a need for a method of deploying a module to a plurality of device types without having to modify the module to conform to a platform of the device type and/or the framework of the application to which the module will be loaded in. There also exists a need for a method of dynamically loading a module for integration with any modular application on any type of device.

SUMMARY

A system and method for loading the same module across a plurality of device types is disclosed.

In one example embodiment, a method for loading a module on the client device includes initializing an application native to the client device, the application including a web browser; determining a module to be loaded on the application, the module written in a web-based format and having a set of dependencies indicated within a code thereof; and loading the determined module on the web browser for recognition by the application native to the client device.

In one aspect, said module is coded in a format directly recognizable by a web browser embedded on the application. Loading a module on the web browser includes checking the set of dependencies of the module. A set of dependencies indicates one or more other modules (base or dependent module) similar in format with the module and respective version identifiers for each of the one or more other modules. This set of dependencies may be indicated in at least one of an identifier of the module, within a source code of the module, and a metadata file attached to the module. Checking the set of dependencies may be performed before, during, and/or after the loading the determined module on the web browser of the application.

Other embodiments, objects, features and advantages of the disclosure will become apparent to those skilled in the art from the detailed description, the accompanying drawings and the appended claims.

BRIEF DESCRIPTION OF THE DRAWINGS

The above-mentioned and other features and advantages of the present disclosure, and the manner of attaining them, will become more apparent and will be better understood by reference to the following description of example embodiments taken in conjunction with the accompanying drawings. Like reference numerals are used to indicate the same element throughout the specification.

DETAILED DESCRIPTION OF THE DRAWINGS

Figure 1:
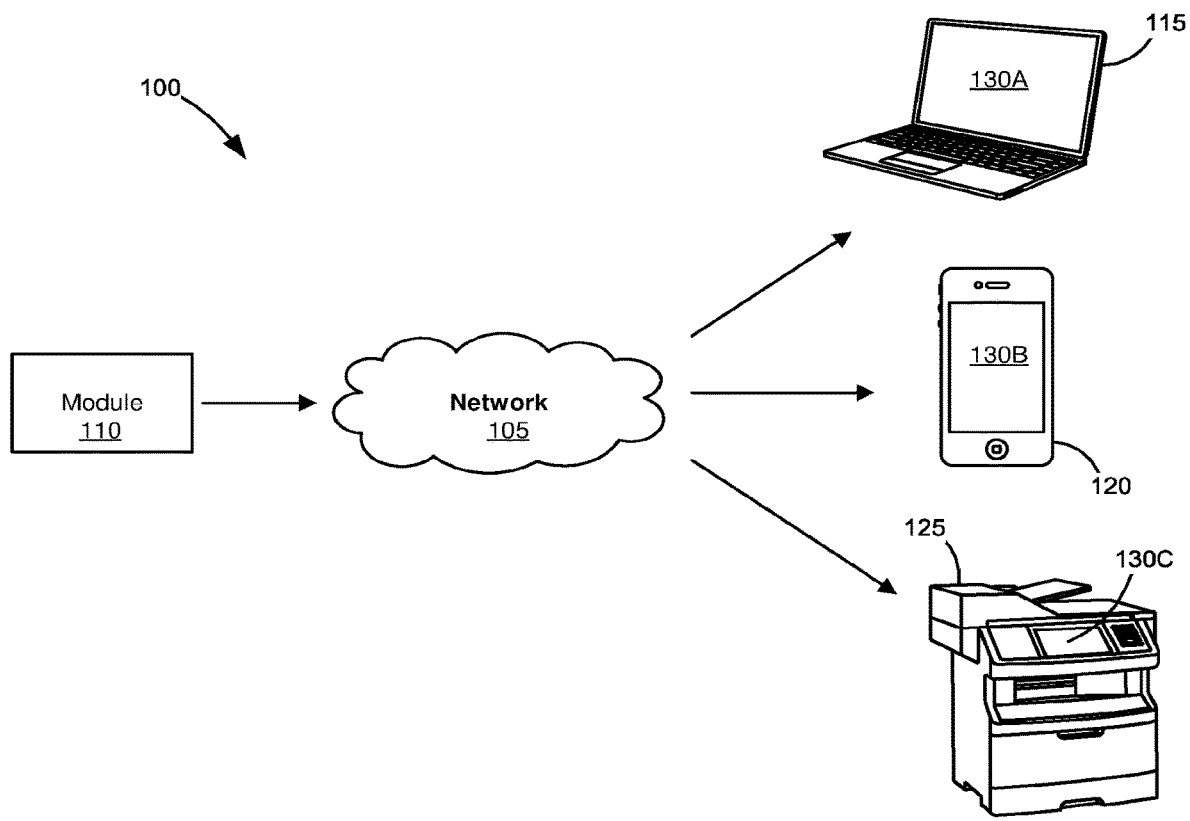
FIG. 1 shows one example embodiment of a system for deploying a module for loading on multiple device types.

The following description and drawings illustrate example embodiments sufficiently to enable those skilled in the art to practice the present disclosure. It is to be understood that the disclosure is not limited to the details of construction and the arrangement of components set forth in the following description or illustrated in the drawings. The disclosure is capable of other embodiments and of being practiced or of being carried out in various ways. For example, other embodiments may incorporate structural, chronological, electrical, process, and other changes. Examples merely typify possible variations. Individual components and functions are optional unless explicitly required, and the sequence of operations may vary. Portions and features of some embodiments may be included in or substituted for those of others. The scope of the application encompasses the appended claims and all available equivalents. The following description is, therefore, not to be taken in a limited sense, and the scope of the present disclosure is defined by the appended claims.

Also, it is to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, the terms "a" and "an" herein do not denote a limitation of quantity, but rather denote the presence of at least one of the referenced item.

It will be further understood that each block of the diagrams, and combinations of blocks in the diagrams, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus may create means for implementing the functionality of each block of the diagrams or combinations of blocks in the diagrams discussed in detail in the descriptions below.

These computer program instructions may also be stored in a non-transitory computer-readable memory that may direct a computer or other programmable data processing apparatus to function in a particular manner, such that the instructions stored in the computer-readable memory produce an article of manufacture including an instruction means that implements the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the function specified in the block or blocks.

Accordingly, the blocks of the diagrams support combinations of means for performing the specified functions, combinations of steps for performing the specified functions and program instruction means for performing the specified functions. It will also be understood that each block of the diagrams, and combinations of blocks in the diagrams, can be implemented by special purpose hardware-based computer systems that perform the specified functions or steps or combinations of special purpose hardware and computer instructions.

Disclosed are a system and methods for deploying a module to applications on a plurality of device types without having to modify the module and/or the application to which it will be loaded in. The methods may include loading a web-based module on a web browser embedded in the application for recognizing the web-based module. An item corresponding to the loaded module may be rendered on the application.

FIG. 1 shows one example embodiment of a system for deploying a module for integration on modular applications native to each of a plurality of device types. System 100 includes a network 105 and a module 110 communicatively coupled with a plurality of device types through network 105. The plurality of device types may be, for example, a desktop computer 115, a mobile device 120, and a multi-function product (MFP) 125. Network 105 may be any network capable of allowing communications between two or more computing systems, as discussed herein and/or available or known at the time of filing and/or developed after the time of filing. For example, network 105 may be a communications network or network/communications network system such as, but not limited to, a peer-to-peer network, a hybrid peer-to-peer network, a Local Area Network (LAN), a Wide Area Network (WAN), a public network such as the Internet, a private network, a cellular network, or a combination of different network types. Network 105 may be a wireless, a wired, and/or a wireless and wired combination network.

Module 110 may be one or more functional units for integration on a modular application executing on a device. Each module 110 may be updated at predetermined instances by administrators or developers. Updating a module may include reducing or adding one or more lines of code therein for increasing the efficiency of its function, adding new functionality or features, adding dependencies, and the like. Updated modules may be given an identifier to indicate a version. The version identifier may be, for example, a number (e.g., 1, 2, 3) or a multipart number (e.g., 1.0, 2.1, 3.4.1). It may also include text (e.g., 1.0-beta, 2.5.7.255-release 1). Other versioning schemes may also be used to identify versions of a module. In one example embodiment, a first compilation or release of module 110 may be versioned as 1.0.0 and a second updated compilation or release of the same module could be version 1.1.0.

The version identifier may be distributed with a module so that a version of the module can be determined when loading the module. The determining of the version identifier may be performed, for example, before, during, or after a module is loaded onto the modular application. The version identifier may be included with the module such as, for example, within its source code or binary representation. The version identifier may be included as a separate metadata file attached to the module. In another example, the version identifier may be included in the module's name.

Module 110 may have one or more second modules 110 dependent therefrom. As such, loading and/or executing a first (base) module 110 may result in also loading and/or executing other (dependent) modules. Dependent modules may be simultaneously executed with or only executed upon request from the first or base module 110. In one example embodiment, a module 110 (e.g., module B) may be configured to depend on a base module 110, Module A. A dependent module may also have one or more modules dependent therefrom. Using the same example, Module B which is dependent from Module A may have Modules C and D dependent therefrom. It will be noted that each of the other modules associated with a module 110, regardless of whether or not it is a base or a depending module, have similar configurations or format with module 110.

In one example embodiment, a module 110 may depend on one or more versions of other module(s) 110. For example, a Module C may be configured to be dependent on either version 2.0.0, 2.1.0, or 2.2.0 of Module A. In other example embodiments, if the versioning scheme supports sortable or incremental version identifiers (for example, incrementing numerical version identifiers), a module 110 may depend on a particular range of versions of other module(s) 110. For example, Module C may be configured to depend on any version of module A that is greater than or equal to 2.0.0 and is less than 3.0.0. In the same example, versions 2.0.0, 2.1.0, 2.15.5, and 2.99.999 would all be valid version identifiers that satisfy Module C's dependency on Module A.

For modules 110 to at least properly load, dependencies of each module 110 relative to another may be checked. Checking module dependencies may be performed before, during, and/or after the loading and/or executing a module 110 in the modular application. Module dependencies may be identified and checked by one or more program instructions of the modular application or by each module. Checking module dependencies may include determining whether or not a base or a dependent module exists for a current module.

In one example embodiment, multiple versions of a module may exist in the system. The checking of dependencies may include determining which respective versions of the base and/or dependent module are specified to load with the current module. For example, if Module B has 2 versions available (1.0.0 and 2.0.0), and it has been indicated in the set of dependencies that Module A is to particularly depend on version 1.0.0 of Module B, then Module B version 1.0.0 will be loaded simultaneously with Module A.

In another example embodiment, a specified module version may not be available. Thus, checking dependencies for loading the module may result in notifying the modular application or the computing device that the specified module and version combination does not exist. For example, if Module A depends on Module B version 1.0.0, and Module B versions 2.0.0 and 3.0.0 are available, then loading Module A on the modular application may determine that the specified version of Module B does not exist.

When it has been determined that a base or dependent module exists, the module may continue to perform its function and execute well in the modular application. Otherwise, when it has been determined that there is no base module or if it has been determined that the base module is not functional, then the depending module (as well as other modules depending on said base module) may fail to load. As such, base modules, if any, are relied upon in loading a particular module. In the contrary, when no module is determined to be dependent on a module 110, said module continues to load and/or to execute well within the application.

Similarly, when it has been identified that specified module version(s) for a base or a dependent module of a current module 110 is available, the current module is loaded well into the application. Otherwise, when it has been identified by the current module that specified version(s) for the base module thereof is/are not available, the current module may be configured to not perform its function. In a similar aspect, when it has been identified by the current module that specified version(s) for modules dependent thereof is/are not available, the current module may continue to perform its function. Additionally, in alternative example embodiments, the current module may be configured to look for the closest version(s) to the required version of the base or dependent module. In the case for example that the current module depends on a particular version range for its base module, each version of the module in the range may be checked for functionality. At least one of the modules having a version within the range may be used for the current module to function.

Module 110 may be comprised of a set of files dependent upon each other for execution. The set of files may include an image, a caption, a configuration file, among others. In one aspect, the one or more files may be packaged. Module 110 may be written in a specific coding implementation inherently recognized by or native to a typical web browser. The coding implementation may be, for example, Javascript, HTML, CSS, and the like. For example, module 110 may include a Javascript file (e.g., "file.js") and one or more HTML pages for execution upon integration on an application.

In one example embodiment, module 110 may include a file indicating a set of dependencies of module 110, such as another file and/or another module 110 associated with module 110 to be included upon integration of module 110 on the modular application. As such, one module 110 may depend on another module 110 or specified version(s) of another module 110.

Module 110 may be stored in a server (not shown). The server may be a computing device that hosts content for accessing by any of desktop computer 115, mobile device 120, and multifunction product 125 through network 105. Examples of the server may include but are not limited to a personal computer, a server computer, a mini computer, a mainframe computer, and/or a series of one of the foregoing. The server may also be a web server (or a series of web servers) that hosts web content such as, for example, files and data associated with an application on a device and may provide the web content when a user of the device requests so through the application. For example, module 110 may be downloaded from an application distribution market server. An appropriate application distribution market server for module 110 may refer to a server that hosts web content that fits to a platform or environment of the application as well as the device type the module is targeted to be loaded in.

In one alternative example embodiment, module 110 may be stored on respective local file systems of desktop computer 115, mobile device 120, and multifunction product 125 such that in some example aspects, the method for creating the modular application on each device type—desktop computer 115, mobile device 120, and multifunction product 125—does not need a connection to a server in order to load module 110.

Desktop computer 115 may be, for example, a laptop computer, a personal computer, a workstation computer or any device that includes a processor and a computer-readable medium, such as a random access memory (RAM), coupled to the processor. The processor executes computer-executable program instructions stored in the memory.

Mobile device 120 may be any computing device that is portable, handheld, or pocket-sized such as a smart phone, a handheld computer, a personal digital assistant (PDA), a notebook computer, a tablet computer, or any other remote computing device, such as a special-purpose remote computing device (e.g. an e-book reader). Mobile device 120 may further be operated on a particular computing platform such as Android, iOS, and Windows, as is apparent in the art.

Multifunction product (MFP) 125 is any device not only capable of printing or producing a hard copy corresponding to a data file or document stored in electronic form, but also of performing other functions, such as faxing, e-mailing, scanning and/or copying, in addition to printing.

Each of desktop computer 115, mobile device 120, and multifunction product 125 may include a processor (not shown) and a computer-readable storage medium (not shown), such as a random access memory (RAM), coupled to the processor. The processor may execute computer-executable program instructions stored in the memory. Computer-executable program instructions may include a set of instructions for executing a browser 130A, 130B, and 130C on desktop computer 115, mobile device 120, and multifunction product 125, respectively, as will be discussed in detail below.

Each of desktop computer 115, mobile device 120, and multifunction product 125 may have different computing platforms. For purposes of the present disclosure, a platform may be the hardware and/or software associated with a device type. A hardware platform may refer to the specific device's processor architecture, while a software platform may refer to the operating system or the computing environment of a device. It may be apparent to those skilled in the art that each device type may be divided into further types depending on the specific platform that it operates in and/or how an environment of the device is configured. For instance, a desktop computer 115 may operate on Windows and/or Linux operating system, while a mobile device 120 may have an Android or iOS operating system. Other examples of specific and different platforms being utilized on a particular device type are apparent in the art.

Desktop computer 115, mobile device 120, and multifunction product 125 may each include a user interface (not shown). The user interface may be, for example, a touch screen, a user panel, or a keypad for users to input or to receive information on each device type. Respective processors of desktop computer 115, mobile device 120, and multifunction product 125 are communicatively coupled with their respective user interfaces such that any user input detected on the user interface will be recognizable by each device type. A user input may be directed to applications executing on the corresponding device type.

With reference still on FIG. 1, desktop computer 115, mobile device 120, and multifunction product 125 may each include a shell (not shown). The shell may be a user interface (UI) component responsible for executing a modular application on a device type as well as dynamically loading and displaying associated modules such as module 110 and/or corresponding interfaces.

A shell may be a set of code written using a coding technology native to a device type to which it is targeted to be executed in, such that it operates solely on one of desktop computer 115, mobile device 120, and multifunction product 125. A shell for a desktop, an iPad®, and a Lexmark multifunction product may be written in C#, Objective-C, and C++, respectively, for example. Since a shell is programmed in a technology specific to a device type, one or more functionalities that are native to the device type may be accessed by the shell, such as, but not limited to, the device's file system, GPS, camera, and/or audio unit.

In an example embodiment, the shell may be a component for recognizing or interpreting web content, such as, for example, a web browser. Web content may be a web page, an image, a video, and/or other files. Web content may include module 110. The shell may be able to communicate with a web server for the web content.

In another example embodiment, the shell may include a component for recognizing or interpreting web code previously described. The component may be embedded on the shell such that the component is also launched upon execution of the shell. In other embodiments, the web component hosted by the shell may be executed once it is triggered by the shell and/or web content is identified for execution on the component. Functionalities that are native to the device type may also be extended to the component through the shell.

One or more modules natively known and configured for integration on the modular application on a specific device type may be loaded through the shell. Moreover, because each shell may be a component or may include a component for recognizing web code, module 110 may be deployed to any device type—desktop computer 115, mobile device 120, and multifunction product 125—without having to modify the module to fit to a platform—hardware or software-specific to the device type.

Figure 2:
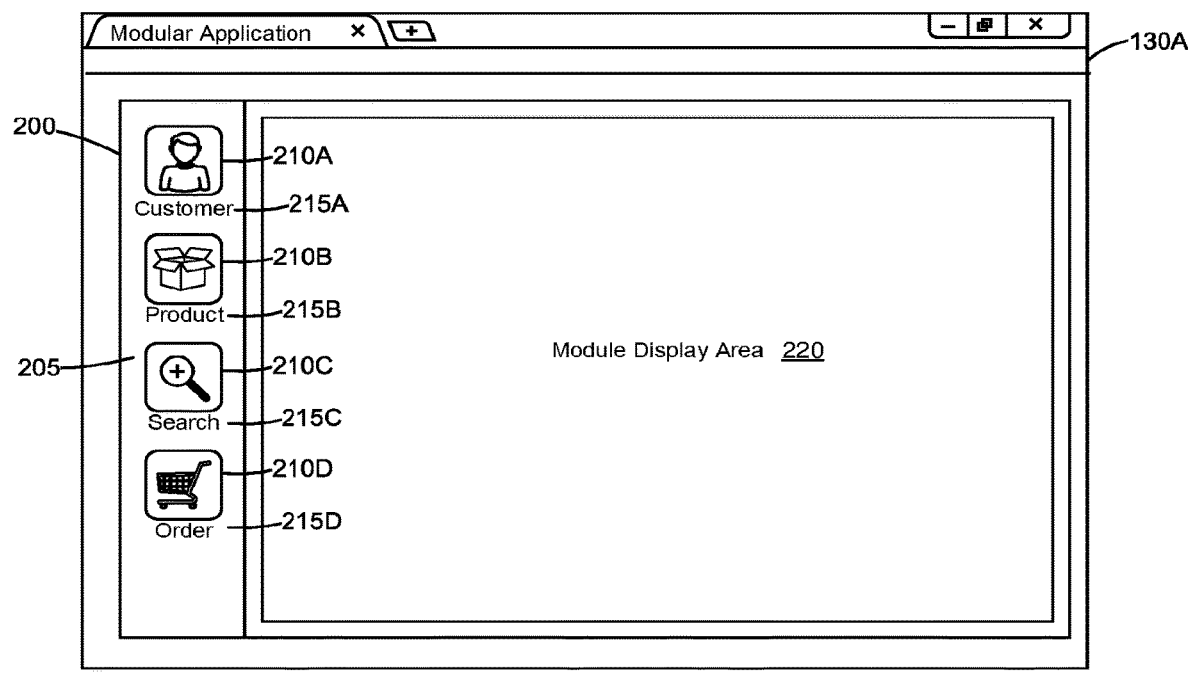
FIG. 2 shows one example embodiment of a modular application displayed in a browser of a client device.

FIG. 2 shows one example modular application or application 200 displayed in browser 130A of desktop computer 115, for example. Browser 130A may be hosted by the shell of desktop computer 115. Application 200 may include a module list 205 displaying a list of module icons 210A-D and associated captions 215A-D and a module display area 220. Browser 130B and 130C of mobile device 120 and multifunction product 125, respectively, may also each have a modular application such as application 200 for native execution therein.

Application 200 on desktop computer 115 may be any application that is comprised of a set of one or more functional units, commonly referred to as modules such as module 110 that are integrated to form application 200 to be accessed by the user using browser 130A. The modules may be individually developed, tested, and/or deployed, and when called or integrated together during runtime, may each encapsulate a portion of the overall functionality of application 200. The modules may each be abstractions for making software development easier or efficient to write and/or to maintain. In this example embodiment, the modules may include module 110.

In one example embodiment, application 200 may contain varying modules based upon the preferences or functionality desired by a user of application 200 on desktop computer 115. For example, a user may choose which of the one or more modules to include in his or her version of application 200. In one example embodiment, application 200 may be a shopping application for selling products, and the user may manage the shopping application and choose to include only modules Customer, Product, Search, and Order in his or her version of application 200. In another example embodiment, another user may manage a shopping application that sells products and provides services from one or more providers and will choose to include Customer, Product, Service, Provider, and Order in his or her version of application 200. In these example embodiments, application 200 may be a web-based application that is accessed by a user through browser 130A. Application 200 may be any data management application or any other type of application as will be known in the art. It will also be appreciated that, in some example aspects, the modules forming application 200 may be pre-set or predetermined by the manufacturer and/or administrator of application 200.

With continued reference to FIG. 2, application 200 may include module list 205 that displays module icons 210A-D and associated captions 215A-D that are representative of the modules selected and desired by the user accessing application 200. Module list 205 may resemble at least one of a toolbar, a drop down list or menu, a grid of icons, or any other panel format that is able to display the icon and/or caption of each module that is loaded with application 200. In this illustrative example embodiment, the modules included in application 200 are the Customer, Product, Search, and Order modules corresponding to module icons 210A-D and their associated captions 215A-D, respectively.

Application 200 may also include a module display area 220. Module display area 220 may be a user interface (UI) of application 200 that displays the module interface of the currently selected module from module list 205. Module display area 220 may also display other pages of application 200, such as, for example, the home page; the site map; a list of user salespersons, invoices or accounts; the details of a contract, user, salesperson, customer or contact; the details of an invoice or account; and images or photos, as will be known in the art.

In one example embodiment, the module list 205 and module display area 220 may be part of the shell of desktop computer 115. The shell may modify the UI dynamically upon the loading of the modules based on the information contained in the modules corresponding to the specified module format.

When application 200 is requested by a user through browser 130A, a web address or page, such as an index.html or index.html file, of application 200 is accessed. A remote server or computer may provide the web address or page to the requesting device. The web address or page may then load or initialize a shell, which then configures or initializes the rest of application 200. The shell may be a framework or handler that coordinates the different modules for loading and accessing by the user while navigating application 200. The shell may load a configuration file or one or more executable instructions for creating and/or customizing application 200. The configuration file may be on the device type to which application 200 may be executing on or on a remote server communicatively connected with the application. Example instructions may include, but are not limited to, obtaining the list of modules to be loaded, determining the initial modules to be loaded in module list 205, determining module dependencies, and/or performing any module-specific initialization. One example module-specific initialization may be obtaining a component, such as an icon or caption, associated with the module and/or creating a toolbar item for the module.

In one alternative example embodiment, the shell may also include other components of application 200 such as, for example, an application logo, a company logo, a user menu, a settings dialog, an about dialog, among others.

In one example embodiment, each of the modules in application 200 may follow a standard module format to be read by the shell. In order for the shell to load the modules dynamically to create application 200, all of the modules for application 200 may be required to follow the module format during their development. In this example embodiment, the shell does not have to be pre-configured with the modules, or to know about the modules to be loaded until after application 200 is launched. Dynamically loading and creating an application having modules that follow the format allows new modules to be coded and deployed after the shell is coded and/or deployed without changing the code for the shell.

However, as discussed above, module 110 may not be in a coding format recognized by or native to the shell but may be recognized by a web browser. In order for module 110 to be loaded on the shell for creating application 200, module 110 may be loaded first through the embedded web browser for recognition. Because the shell of desktop computer 115 may be or includes browser 130A therein, the shell may be able to load module 110 together with the one or more modules dynamically to create application 200. As such, module 110 may be dynamically loaded to create application 200 and new modules based on module 110 may be coded and deployed through the shell.

The module format may require the modules to specify at least the following information: a name, an icon such as module icons 210A-D, captions such as captions 215A-D, a default URL to be used to access the module, a module element containing the files for rendering the module, and a mapping of URL patterns to callback functions for the module, where each URL pattern is mapped to a single callback function to form a URL pattern-callback function pair. The collection or URL patterns may be any type of data structure. For example, the collection of URL patterns may be a list, a linked list, a hash, an array, and the like. In some example aspects, where the module performs the single function, there is only a single URL pattern-callback function pair. Other information may also be included in the module format, as will be known by those skilled in the art.

Module icons 210A-D may each be a graphical object representative of its corresponding module while captions 215A-D may be explanatory text that each describes its corresponding module. The default URL of the module may be the URL to access an initial rendered state or user interface element of the module such as, for example, an index, initial or default entry page, default URL or home page of the module.

The module element of each of the modules may include a rendered state of the module or the output HTML of the module. If the module has not been previously accessed by the user, the module element may be the index of the module. In some example embodiments, if the module has been previously accessed by the user, the element may be the last rendered state of the module such as, for example, the last page of the module that was displayed in module display area 220. It will be appreciated by those skilled in the art that the module element may pre-set or pre-designated to a particular page or state, regardless of whether the user previously accessed the module.

The mapping of URL patterns to one or more callbacks refer to a list of routes that may be used to call registered callback functions that render a user interface. For illustrative purposes, Table 1 shows an example list of routes or URL patterns for the Customer module and an explanation of the functions of each route:

TABLE 1

Example URL Patterns and Associated Functions

| Route | Function |
| --- | --- |
| /customers | Shows a list of customers |
| /customers/:id | Shows the details of a specific customer, specified by the ID |
| /customers/:id/documents | Shows a list of documents available for the customer |
| /customers/:id/documents/:documentId | Shows the details of a specific document specified by the document id, for a specific customer, specified by the id. |
| /customers/:id/documents/:documentId/pages/:pageId | Shows a specific page on a specific document for the customer |

For example, when a user navigates to an example URL http://example/customers/1234 or http://example/customers/9876, the details of Customer ID 1234 or 9876, respectively, will be retrieved, rendered and displayed in module display area 220. The module may determine from which storage location the details are retrieved. For example, the details may be retrieved from a server or a database. If the user further navigates to another example URL: http://example/customers/1234/documents/abcd, the document abcd that belongs to customer 1234 is retrieved, rendered and displayed in module display area 220.

The routes may be URL patterns to be matched by the shell. Whenever the user navigates to a current URL in browser 130A, the shell looks through all the defined URL patterns of the module to determine if the current URL matches a URL that is defined by any of the loaded modules. Upon a positive determination, a callback function mapped to the route may be called by the shell. Other methods of URL routing which enables application 200 to use URL patterns to retrieve data and invoke callback functions will be known to those skilled in the art.

In one example embodiment of the present disclosure, each of the modules is allowed to define its own set of routes. When a module is loaded, the shell retrieves all of the defined routes from the module and dynamically adds them to a list of routes that the shell periodically checks when a new URL is navigated to. In one example embodiment, the callbacks are defined in the module such that one module may not be aware about the callbacks or routes contained in another module.

Because of the independence in developing each of the modules in the example embodiment, with each module having its own set of routes and URL patterns, developers may add a new module to application 200 at any time without changing the code of any other elements of application 200, such as those of the shell or of the other existing modules. When a new module is installed, the shell of application 200 automatically retrieves the new URL routes available and specified by the module during installation or loading. This allows the developers to add new functionality to application 200 at any time without affecting the development time of any other module.

Allowing the module to define and maintain its own set of routes also allows the customer, or another company, to write a module without any access to the code of the modules created by another developer, and subsequently, add the newly-developed module or functionality to application 200.

Figure 3:
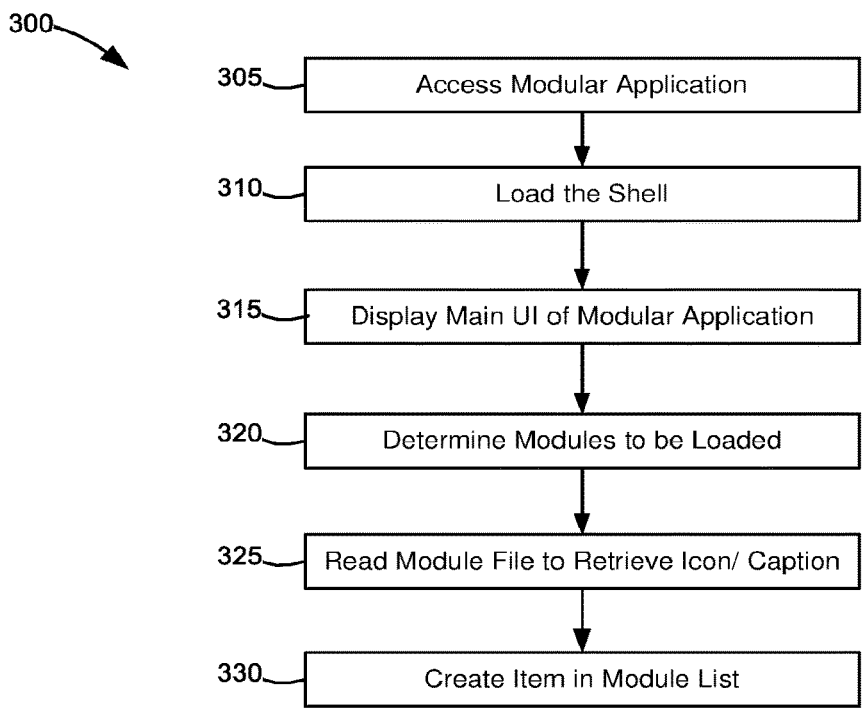
FIG. 3 is one example flowchart of a method for loading one or more modules of the example application of FIG. 2 upon initialization of the application at runtime, according to one example embodiment.

FIG. 3 shows one example flowchart of a method 300 for loading one or more modules of application 200 to create the application at runtime, according to one example embodiment. Method 300 may be performed using desktop computer 115 that accesses application 200 through browser 130A. Method 300 loads application 200 by loading the shell of application 200, which then handles the rest of the application initialization process such as determining the modules to be loaded, retrieving initialization details of the modules, and preparing module list 205 of application 200.

At block 305, application 200 may be accessed by a user through browser 130A. The user may access application 200 by entering the URL referencing application 200 on the address bar (not shown) of browser 130A. Browser 130A then uses the URL to request a page or file from a server associated with the URL and requests or downloads the page through network 105 and into desktop computer 115 for displaying on browser 130A. In one alternative example embodiment, browser 130A may retrieve the page from desktop computer 115 in a system wherein the module files are saved in client device 115 instead of on the server.

In some example embodiments, the user may also click a link that redirects browser 130A to the URL of application 200 and loads the elements of application 200 from such link. Other means of accessing application 200 such as, for example, by opening a computer program installed in desktop computer 115 that is designed to access application 200 through a server (not shown), will be known in the art.

For example, the user may type http://example in the address bar of browser 130A, which is the assigned URL for accessing application 200. In some other example aspects, the user may click a hyperlink to http://example provided to the user by other means such as, for example, through an e-mail sent to the user.

At block 310, the shell is loaded in browser 130A. The shell may be loaded when application 200 is successfully accessed or launched in browser 130A. Loading the shell after application 200 has been requested by the user allows application 200, through the shell, to initialize or set up its modules and the rest of application 200 to form a cohesive interface to the user.

At block 315, the shell may load and display a main UI of application 200 in browser 130A. The main UI may be an index file or may be loaded by an index file. An index file is typically the first file that is loaded when an application is requested such as, for example, an index.html file that is loaded when a web application is requested from browser 130A. The index file may also be referred to as the home page of application 200. The main UI may include module list 205 and module display area 220 (shown in FIG. 2).

At block 320, the shell may determine which modules are to be loaded. Determining the modules to be loaded may include retrieving a list of modules or other identifier associated with each module to load from a server (not shown). In some example aspects, determining the modules to be loaded may also include confirming or verifying which modules are to be associated with an identifier.

As discussed above, differing modules may be loaded for each application 200, depending upon one or more variables such as, for example, an identifier associated with the user or device accessing application 200.

In some example embodiments, the identifier may be a user or group identifier. In one example aspect, the identifier of the user may be determined by a request of credentials for the user prior to loading the shell. For example, the identifier may be determined by a single sign-on system, Active Directory by Microsoft or other identity provider. In other example aspects, the shell may first be loaded and the user credentials received from a user, before loading the modules associated with the user credentials. In such example aspects, the user credentials may be retrieved from a login view that may be part of the shell. In yet other example aspects, the user credentials may be received from a designated storage location (e.g., USB or flash drive).

For example, the shell may determine that application 200 being accessed by the user having identifier 123123 may include the modules Customer, Product, Search and Order.

In other example embodiments, other identifiers may be used in addition to or in lieu of user credentials to verify which modules are to be loaded on browser 130A. Such other identifiers may include an IP address of desktop computer 115, the type of client device (e.g., a desktop computer) accessing application 200 or a date/time stamp.

In still other example embodiments, the identifier may be a state of the application. For example, if the module to be loaded performs the function of displaying the tasks to be completed, and there are no outstanding tasks, the module may not be loaded.

In yet other example embodiments, the identifier may be a user's preferences, privileges, or an identifier of a group to which the user belongs. For example, a user may choose to hide a module and prevent its loading or a system administrator may have the right to load a module but a salesperson may not.

At block 325, a module file may be read for each of the modules to be loaded as part of the initialization of application 200 in order to retrieve information about the modules. As discussed above, the module file may contain information such as, for example, a name, icon, caption, and/or mapping of URL patterns to callbacks or routes in a specific format, which the shell uses to dynamically load the module to create application 200.

The module file may also include information used for initializing the corresponding module. For example, the module file may include or may contain one or more instructions to access an icon associated with the module such as, for example, an image that will be rendered and displayed in module list 205 of application 200 to represent the loaded module. The module file may also include a caption or a label associated with the module that may be displayed in module list 205. In some example embodiments, information used for initializing the modules may come from multiple sources. For example, in some aspects, the caption associated with the module may be included in the module file while the icon may be retrieved from a server (not shown).

In yet other example embodiments, the icon and the caption may be generated by the module, such as, for example, when the module does not contain a static (e.g., coded) caption but instead contains a function that generates the caption based on one or more variables (e.g., time of the year, user accessing the module, etc.). Other methods of generating and/or retrieving the icon and/or the caption will be known in the art.

Other information related to each of the modules to be loaded, rendered and displayed in browser 130A may also be retrieved from the module file and executed by the shell such as, for example, routes, initialization information, and/or module dependencies, among others.

At block 330, an item in module list 205 may be created by the shell for each loaded module. An item may refer to an instance of the list item rendered and displayed in module list 205. As shown in FIG. 2, each of the icon/caption pairs in module list 205 corresponds to one item created and loaded in module list 205. For example, once the shell is given the list of modules to be loaded (e.g., Customer, Product, Search, and Order), the shell reads the module file associated with each of the Customer, Product, Search, and Order modules in module list 205. Initializing the modules may be performed by reading the module file that contains information in the specified module format.

Figure 4:
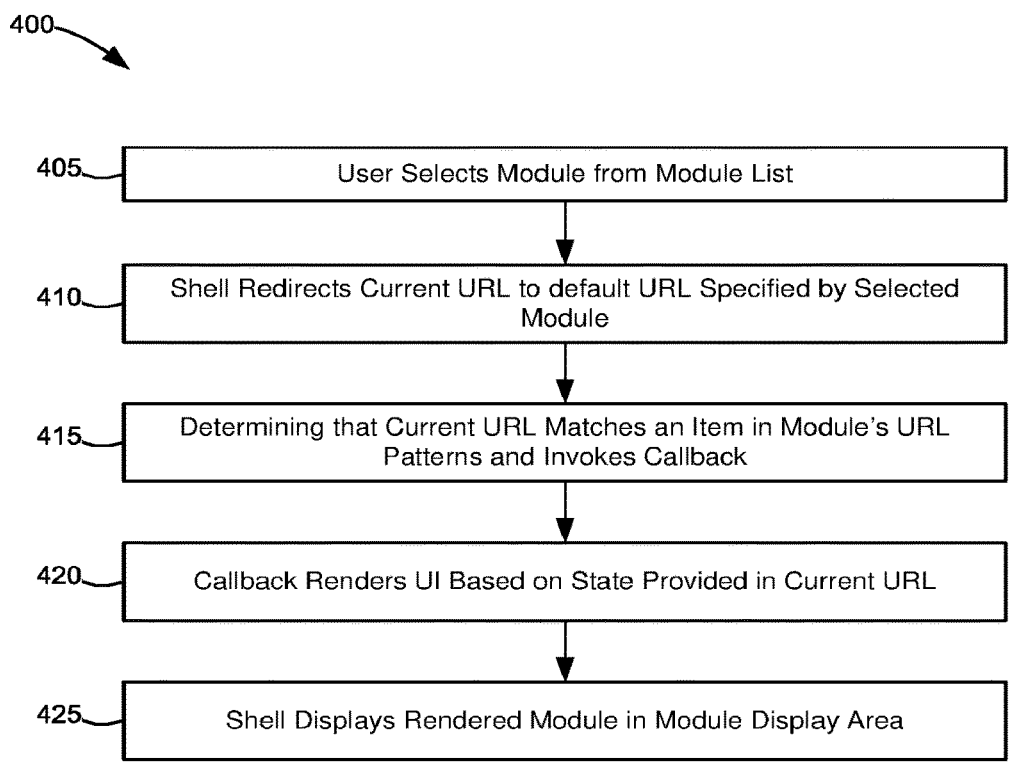
FIG. 4 is one example flowchart of a method for opening a module in the example application of FIG. 2 that has not been previously accessed.

FIG. 4 shows one example flowchart of a method 400 for opening or accessing a module in application 200 that has not been previously accessed. In this example embodiment, the user opens the module identified by its icon and/or caption and displayed in module list 205 by selecting the module from module list 205. Method 400 may be performed by the shell of application 200.

At block 405, a user of application 200 activates or accesses one or more functionalities of a module by selecting it from module list 205. Selecting a module may include raising an event associated with the icon and/or caption of the module. For example, selecting a module may include, but is not limited to, clicking on the icon and/or caption or choosing the desired module from a selection list presented in another format, such as, for example, a drop down menu, radial button list, check box list or hyperlink list. In some example aspects, selecting a module may include navigating to a URL that matches a route associated with the desired module.

For example, the user may wish to access the Customer module to check a profile of a customer registered in application 200. The user may access the Customer module by clicking Customer icon 210A and/or Customer caption 215A which references a URL designated to the Customer module.

At block 410, upon receiving the event, the shell may redirect the URL that is currently displayed in module display area 220 to a URL associated with the selected module. The current URL may refer to the URL in the address bar of browser 130A, as is known in the art. In some example aspects, the current URL may not be displayed in the address bar and may instead be a hidden variable such as, for example, when browser 130A is embedded in another application.

Upon the current URL changing, the shell then determines if the new current URL matches an item in the module's URL patterns. Upon a positive determination or match, the shell may invoke a callback that is mapped to the matched URL pattern (block 415).

For example, the URL pattern /customers/:customerId is associated with the callback function show showSingleCustomer(customerId) which shows a profile of a single customer having a specific customer ID. When the user navigates to http://example/customers/9876, the shell determines which URL pattern the current URL matches. Upon determining that the current URL matches/customers/:customerId, the shell calls the associated callback function showSingleCustomer(customerId), and passes the customerId variable from the current URL (e.g., 9876) to the callback function. The callback function may use the submitted customerId variable to perform the request.

At block 420, the module's callback function renders its user interface, which is the representation of the module, based on the state provided in the current URL. For example, the module user interface may be a document object model (DOM) element, user control, image, page, or other visual representation.

At block 425, the shell displays the module's user interface in module display area 220 to the user. The rendered and displayed state of the module is now ready for use by the user.

For example, once the callback function showSingleCustomer(customerId) receives the customerId, the module retrieves the profile corresponding to the customerId (e.g., 9876) and then renders a user interface corresponding to the profile of Customer 9876 in module display area 220. The rendered profile of Customer 9876 is placed in module display area 200 and is then ready for viewing and use by the user.

In some example embodiments, the shell may also determine the module that the route belongs to so that the shell may highlight or otherwise indicate to the user that the module is the currently selected or currently navigated to module. Since each route is specified by a module, whenever a matching route is found, the shell can identify which module defined that route. The shell may then indicate or otherwise identify the currently selected module to the user by highlighting the selected module on a toolbar, for example.

In other example embodiments of loading a module into application 200, the module may be opened via a direct URL instead of via module list 205. In such example embodiments, the module may be activated by the user navigating directly to a URL location that can be handled by a module. The URL may be associated with the module as is typical in web applications wherein at least one or more functions or features of the module is assigned a URL that automatically redirects the display to the activated function or feature of the specific module selected by the user. When the URL is entered by the user, the shell determines which of the modules the current URL matches an item in the module's URL pattern and invokes the callback. The invoked callback then renders its user interface based on the state provided in the current URL location and provides the rendered user interface to the shell. The shell displays the user interface in module display area 220. In some example aspects, the shell may also indicate the selected module in module list 205.

After the shell loads, renders and displays the requested module in browser 130A, the user may navigate within the displayed module user interface through browser 130A and access one or more functions of the module. As the user navigates within the displayed module user interface, updates to the module interface displayed may be triggered in module display area 220. The updates may include dynamically changing the page being displayed in module display area 220 in response to the event triggered by the user navigation.

For example, the Customer module may include one or more links that reference one or more pages associated with the Customer module such as, for example, one or more Customer profile pages. The shell may render and display the Customer profile pages as they are accessed by the user via clicking URLs of the profile pages, as will be known in the art.

In some example embodiments, the user may also navigate from the displayed module to another module. For example, while navigating the Customer module, the user may access the Product module by clicking the Product icon 210B and/or Product caption 215B which triggers the shell to access the URL of the Product module.

In some example aspects, a user may wish to revisit a previously viewed record or page. To assist the user in navigating or accessing previously viewed or accessed records or data more easily or more efficiently, the shell may save the last rendered state or page of the previously loaded module before navigating to or accessing the new module. The saving of the last rendered state in a repository may also help in serving up future requests for that module faster. In some example aspects, the last rendered state may contain values or dependencies that may have been initialized during the user's previous access of such module. In other example aspects, loading the saved element may also eliminate the need for module data to be recomputed or fetched from its original storage location such as in the case of accessing the module for the first time. Thus retrieving and loading the last rendered state of the module from the repository may, therefore, be comparatively faster than loading the module and re-initializing the module.

For example, when the user selects the Customer module again, the user may not want to have to find, search for or otherwise locate the previously-viewed customer again. By saving the last rendered state of the Customer module, the shell is able to display the data associated with the most recent customer accessed by the user when the user selects or returns to the Customer module again.

Figure 5:
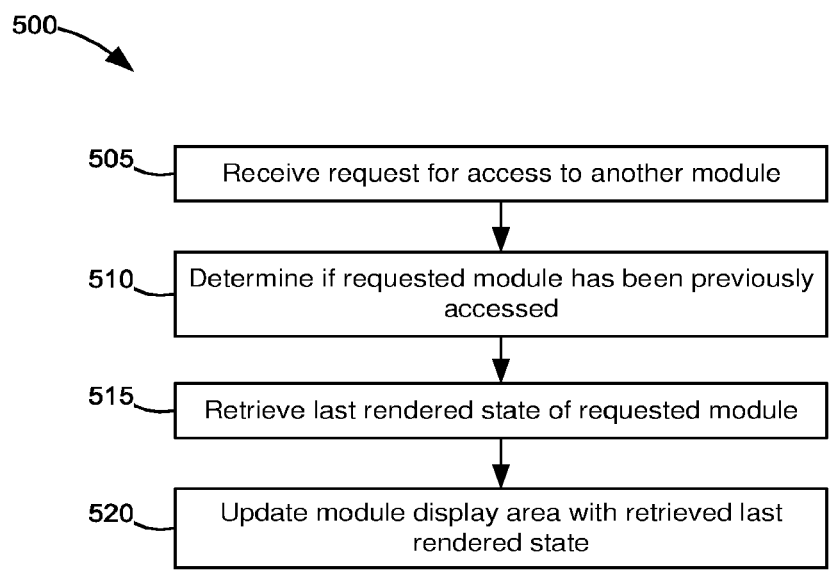
FIG. 5 is one example flowchart of a method for opening a module that has been previously navigated to by a user of the example application of FIG. 2 that has its last rendered state saved by the shell.

FIG. 5 shows one example flowchart of a method for opening or accessing a module that has been previously navigated to by a user of application 200 that has its last rendered page or state saved by the shell. The shell may listen for events in application 200 that indicate that the user has selected a module either from module list 205 or from a direct URL, then determine if the user has selected a module that has been previously navigated to or accessed. If the user has selected a module that has not been previously accessed, the selected module may be loaded using example method 400, as discussed above.

At block 505, the shell receives a request for access to another module from the user. The request may be triggered by the user clicking a URL referencing another module, as will be known in the art. For example, requesting a module may include, but is not limited to, clicking on the icon and/or caption or choosing the desired module from a selection list presented in another format, such as, for example, a drop down menu, radial button list, check box list or hyperlink list. In some example aspects, requesting a module may include navigating to a URL that matches a route associated with the desired module.

At block 510, the shell determines if the requested module has been previously accessed. The request may be triggered by the user clicking a URL referencing another module, as will be known in the art.

If the requested module was previously accessed or navigated to by the user, the shell may retrieve the last rendered state of the requested module (at block 515) from a repository in client device 115, such as in a cache or other memory, or a repository stored remotely, such as in a database or other remote cache.

The shell may then update module display area 220 with the retrieved last rendered state (at block 520). Updating module display area 220 may include the shell saving the currently rendered state of the currently displayed module prior to replacing the current module user interface with the last rendered state of the requested module in module display area 220.

For example, referring to FIG. 2, after browsing through the Product module, the user may re-access Customer module by clicking Customer icon 210A or caption 215A. The shell determines that the user has previously accessed the Customer module and saved the last rendered state for the Customer module. The shell then retrieves and displays the last rendered state of the Customer module updates module display area 220.

In some alternate example embodiments, updated module display area 220 may display the user interface of the requested module as if the requested module had never been previously accessed. The method of displaying such user interface may be accomplished using example method 400 of FIG. 4 starting at block 410.

It will be understood that the example embodiments described herein are illustrative and should not be considered limiting. It will be appreciated that the actions described and shown in the example flowcharts may be carried out or performed in any suitable order. It will also be appreciated that not all of the actions described in FIGS. 3-5 need to be performed in accordance with the example embodiments of the disclosure and/or additional actions may be performed in accordance with other example embodiments of the disclosure.

Many modifications and other embodiments of the disclosure set forth herein will come to mind to one skilled in the art to which these disclosure pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computing system, comprising:
a processor; and
memory storing instructions that, when executed by the processor, cause the processor to perform acts comprising:
receiving an indication that a modular application has been accessed on a computing device, wherein the indication comprises an identifier associated with functionality that is provided by the modular application, wherein the modular application is configured to execute within a first type of operating system (OS) that executes on the computing device, and further wherein the modular application includes an embedded web browser;
upon receiving the indication, identifying a module based upon the identifier, wherein the module is written in a web coding language; and
causing the module to be loaded into the embedded web browser of the modular application, wherein the embedded web browser of the modular application executes the module to perform an action in furtherance of the functionality.

2. The computing system of claim 1, wherein the computing system is the computing device.

3. The computing system of claim 1, wherein the computing system is a server computing device that is in network communication with the computing device.

4. The computing system of claim 1, the acts further comprising:
receiving a second indication that a second modular application has been accessed on a second computing device, wherein the second indication comprises the identifier, wherein the second modular application is configured to execute within a second type of OS that executes on the second computing device, and further wherein the second modular application includes a second embedded web browser;
upon receiving the second indication, identifying the module based upon the identifier; and
causing the module to be loaded into the second embedded web browser of the second modular application, wherein the second embedded web browser executes the module to perform the action in furtherance of the functionality.

5. The computing system of claim 1, the acts further comprising:
upon identifying the module, identifying a set of dependencies of the module based upon data included in the module, wherein the set of dependencies includes a set of modules upon which the module depends; and
causing the set of modules to be loaded into the embedded web browser, wherein the embedded web browser executes the set of modules when the embedded web browser executes the module.

6. The computing system of claim 1, wherein the web coding language includes one or more of:
Javascript;
HyperText Markup Language (HTML); or
Cascading Style Sheets (CSS).

7. A method executed by a processor of a computing system, the method comprising:
receiving an indication that a modular application has been loaded on a computing device, wherein the indication comprises an identifier associated with functionality that is provided by the modular application, wherein the modular application is configured to execute within a first type of operating system (OS) that executes on the computing device, and further wherein the modular application includes a web browser;
upon receiving the indication, identifying a module based upon the identifier, wherein the module is written in a web coding language; and
causing the module to be loaded into the web browser of the modular application, wherein the web browser of the modular application executes the module to perform an action in furtherance of the functionality.

8. The method of claim 7, further comprising:
receiving a second indication that a second modular application has been loaded on a second computing device, wherein the second indication comprises the identifier, wherein the second modular application is configured to execute within a second type of OS that executes on the second computing device, and further wherein the second modular application includes a second web browser;
upon receiving the second indication, identifying the module based upon the identifier; and
causing the module to be loaded into the second web browser of the second modular application, wherein the second web browser executes the module to perform the action in furtherance of the functionality.

9. The method of claim 8, wherein the computing device is a mobile computing device, wherein the first type of OS is a mobile OS, wherein the second computing device is a desktop computing device, wherein the second type of OS is a desktop OS.

10. The method of claim 7, further comprising:
identifying a second module based upon a second identifier included in the indication, wherein the second identifier is associated with second functionality that is provided by the modular application, wherein the second module is written in the web coding language; and
causing the second module to be loaded into the web browser of the modular application, wherein the web browser of the modular application executes the second module to perform a second action in furtherance of the second functionality.

11. The method of claim 7, further comprising:
subsequent to causing the module to be loaded into the web browser of the modular application, obtaining an updated version of the module, wherein the updated version of the module is written in the web coding language;
receiving a second indication that the modular application has been loaded on the computing device, wherein the second indication comprises the identifier;
upon receiving the second indication, identifying the updated version of the module based upon the identifier; and
causing the updated version of the module to be loaded into the web browser of the modular application, wherein the web browser of the modular application executes the updated version of the module to perform the action in furtherance of the functionality.

12. The method of claim 7, wherein the module is identified from amongst a plurality of modules based upon the identifier.

13. The method of claim 7, wherein the action includes presenting a graphical user interface (GUI) on a display of the computing device.

14. A non-transitory computer-readable storage medium comprising instructions that, when executed by a processor of a computing system, cause the processor to perform acts comprising:
receiving an indication that a modular application has been accessed on a computing device, wherein the indication comprises an identifier associated with functionality that is provided by the modular application, wherein the modular application is configured to execute within a first type of operating system (OS) that executes on the computing device, and further wherein the modular application includes an embedded web browser;
upon receiving the indication, identifying a module based upon the identifier, wherein the module is written in a web coding language;
identifying a set of dependencies of the module based upon metadata included in the module, wherein the set of dependencies includes a set of modules upon which the module depends; and
causing the module and the set of modules to be loaded into the embedded web browser of the modular application, wherein the embedded web browser of the modular application executes the module and the set of modules to perform an action in furtherance of the functionality.

15. The non-transitory computer-readable storage medium of claim 14, the acts further comprising:
receiving a second indication that a second modular application has been accessed on a second computing device, wherein the second indication comprises the identifier, wherein the second modular application is configured to execute within a second type of OS that executes on the second computing device, and further wherein the second modular application includes a second embedded web browser;
upon receiving the second indication, identifying the module based upon the identifier;
identifying the set of dependencies of the module based upon the metadata included in the module;
causing the module and the set of modules to be loaded into the second embedded web browser of the second modular application, wherein the second embedded web browser of the second modular application executes the module and the set of modules to perform the action in furtherance of the functionality.

16. The non-transitory computer-readable storage medium of claim 15, wherein the computing device is a first mobile computing device, wherein the first type of OS is a first mobile OS, wherein the second computing device is a second mobile computing device, wherein the second type of OS is a second mobile OS.

17. The non-transitory computer-readable storage medium of claim 14, wherein causing the module and the set of modules to be loaded into the embedded web browser comprises downloading the module and the set of modules from an application server.

18. The non-transitory computer-readable storage medium of claim 14, wherein the indication is received when a graphical user interface (GUI) element displayed on the computing device is selected by a user of the computing device.

19. The non-transitory computer-readable storage medium of claim 14, wherein the set of modules are written in the web coding language.

20. The non-transitory computer-readable storage medium of claim 14, the acts further comprising:
receiving a user identifier of a user of the modular application, wherein the module is identified from amongst a plurality of modules additionally based upon the user identifier of the user.

\* \* \* \* \*